No. 766,302. PATENTED AUG. 2, 1904.
F. P. WHITE.
WHEEL.
APPLICATION FILED NOV. 4, 1903.
NO MODEL. 3 SHEETS—SHEET 3.
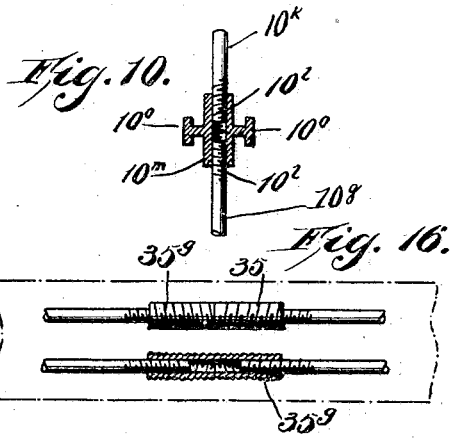
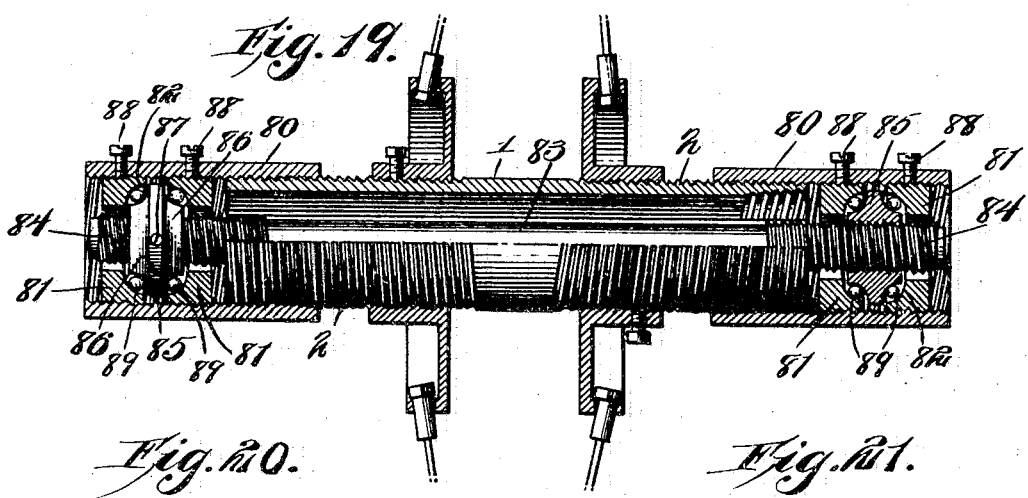
Witnesses
E. K. Stewart
Wm. Bagger
Franklin P. White
Inventor
by C. A. Snow & Co
Attorneys No. 766,302. Patented August 2, 1904.

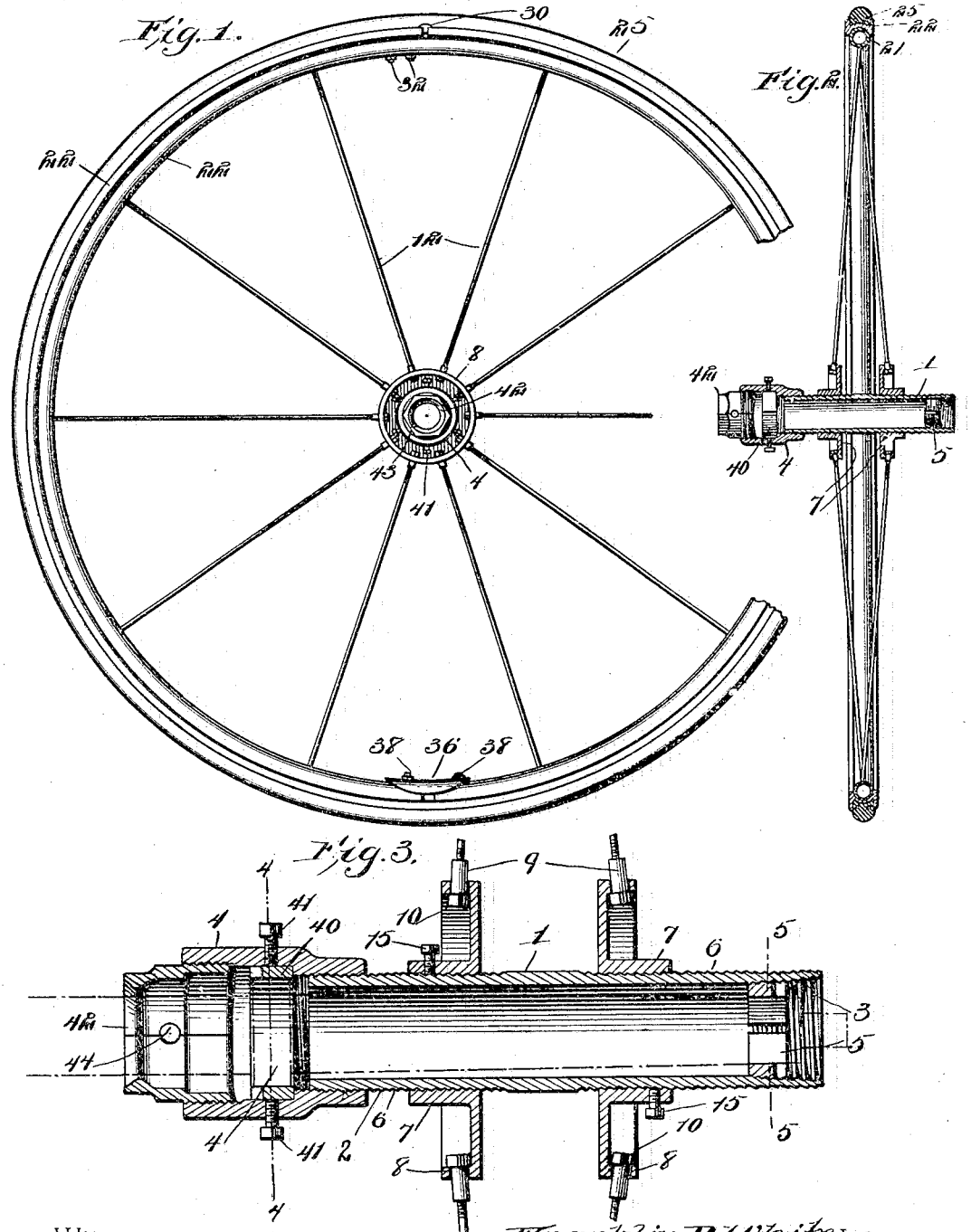

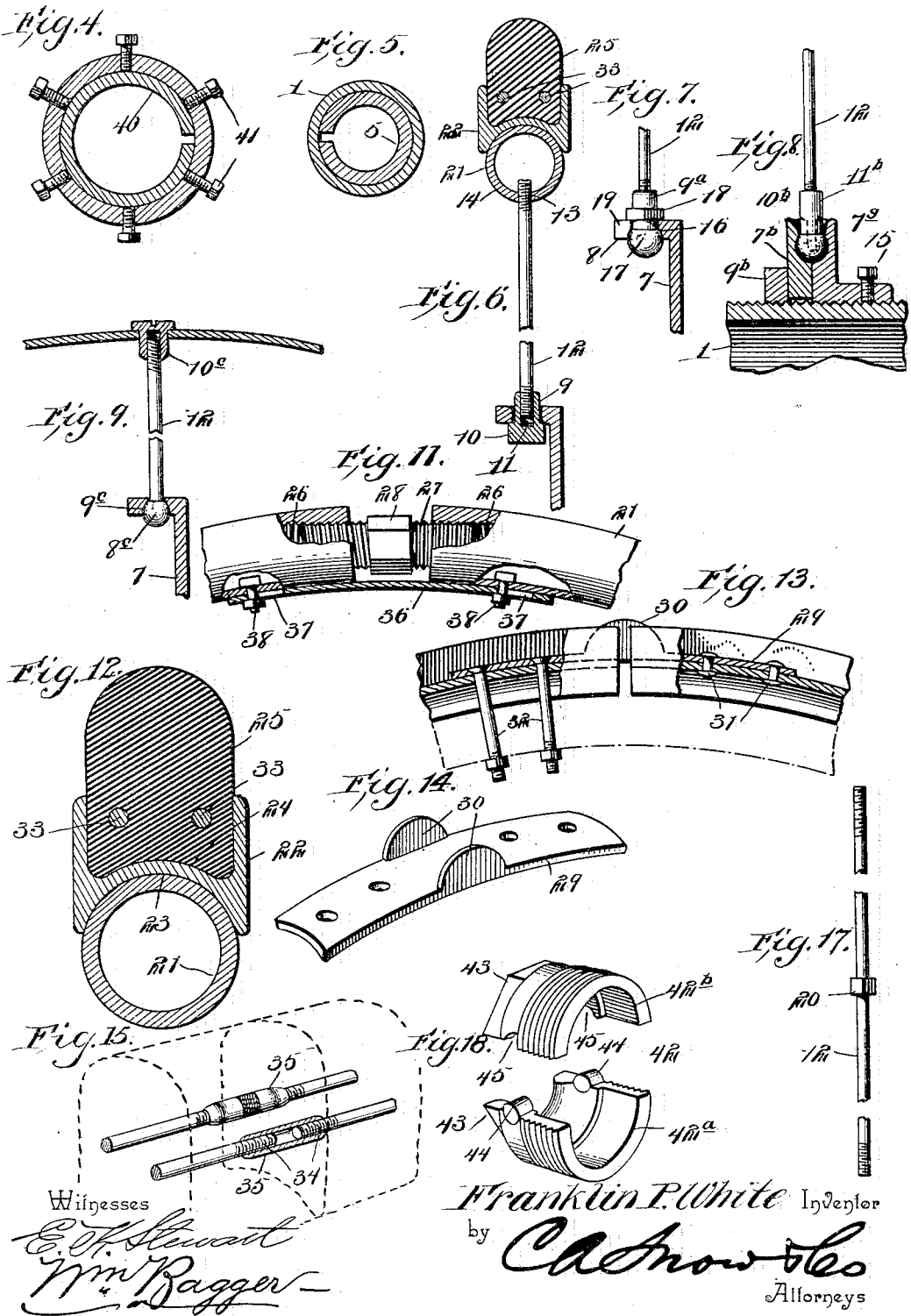

UNITED STATES PATENT OFFICE.

FRANKLIN P. WHITE, OF SHALLOTTE, NORTH CAROLINA.

WHEEL.

SPECIFICATION forming part of Letters Patent No. 766,302, dated August 2, 1904.

Application filed November 4, 1903. Serial No. 179,847. (No model.)

*To all whom it may concern:*

Be it known that I, FRANKLIN P. WHITE, a citizen of the United States, residing at Shallotte, in the county of Brunswick and State of North Carolina, have invented a new and useful Wheel, of which the following is a specification.

This invention relates to wheels and to the construction of wheels for carriages, bicycles, and for vehicles generally; and it has for its object to provide a wheel which shall possess superior advantages in point of simplicity, durability, and general efficiency.

The invention consists in the improved construction, arrangement, and combination of parts, which will be hereinafter fully described, and particularly pointed out in the claims.

In the accompanying drawings, Figure 1 is a side elevation of a wheel characterizing my invention. Fig. 2 is a vertical transverse sectional view. Fig. 3 is a longitudinal sectional view of the hub of my improved wheel and related parts enlarged. Fig. 4 is a sectional view taken on the line 4 4 in Fig. 3. Fig. 5 is a sectional view taken on the line 5 5 in Fig. 3. Fig. 6 is an enlarged sectional detail view showing the inner and outer ends of one of the spokes and illustrating the preferred form of mounting the latter. Fig. 7 is a view similar to Fig. 6, illustrating a modification. Fig. 8 is a similar view showing another modification. Fig. 9 is a similar view showing still another modification. Fig. 10 is a detail view showing another modification, the spoke being divided and its ends connected by an intermediate nipple. Fig. 11 is a side elevation, partly in section, showing the ends of the tubular rim and the means for connecting and tightening the same. Fig. 12 is a transverse sectional view, on an enlarged scale, taken through the complete rim of the wheel, including the tubular rim or felly, the channel-bar, and the rubber tire. Fig. 13 is a side elevation, partly in section, showing the ends of the channel-bar and the means for connecting and tightening the same. Fig. 14 is a perspective detail view showing the connecting means for the ends of the channel-bar and related parts. Fig. 15 is a perspective detail view, partly in section, showing the means for connecting the ends of the rubber tire. Fig. 16 is a similar view illustrating a modified construction of the means for connecting the ends of the rubber tire. Fig. 17 is a detail view of one of the spokes, exhibiting a wrench-seat whereby it may be conveniently manipulated when inserted and tightened in the wheel. Fig. 18 is a perspective view of the parts constituting a sand-band. Fig. 19 is a longitudinal sectional view showing a hub converted into a ball-bearing hub. Fig. 20 is a detached view of a special wrench for setting or manipulating the split rings 5 and 40. Fig. 21 is a sectional detail view of the rim of a bicycle-wheel of special construction.

Corresponding parts in the several figures are indicated by similar numerals of reference.

The hub of my improved wheel comprises, initially, a cylindrical tubular box 1, which when desired may be mounted directly upon a suitable cylindrical spindle. When it is to be used in connection with the customary tapering spindle, however, it becomes necessary to provide it with interior bearings for such tapering spindle. In order to accomplish this, one end of the cylindrical box is exteriorly screw-threaded, as shown at 2, while the other end is provided with an interior tapering thread 3. Upon the former thread at the inner end of the box is mounted an expanded flanged sleeve or collar 4, which is suitably constructed to engage the shoulder usually formed upon an axle-arm adjacent to the spindle. In the outer ends of the tube 1, having the tapering screw-threaded recesses 3, is mounted a split sleeve 5, which is tapering and exteriorly screw-threaded to engage the tapering threaded portion 3, so that consequently when the said sleeve is screwed into the tube 1 it is thereby compressed to such an extent as to fit and form a bearing for the outer end of the spindle, which in the drawings has been shown by dotted lines. As regards the spindle, it may be of the ordinary well-known or of any suitable preferred construction.

The tubular hub 1 is provided on its outside with right and left hand screw-threaded portions 6 6, which extend to the ends of said tube to provide for the adjustment thereon of a pair of sleeves 7, provided at their circumferences with outwardly-extending annular flanges 8. The annular flanges 8 are perforated at intervals to afford seats for the nipples 9, the heads 10 of which form wrench-seats in order to enable them to be properly manipulated. The outer ends of the nipples 9 have screw-threaded recesses 11 for the reception of the inner ends of the spokes 12, the outer ends of which are seated in screw-threaded openings 13 in the inner side of the tubular metal rim 14 of the wheel. This is the construction illustrated in Fig. 6 of the drawings. The inner ends of the spokes are staggered, being connected alternately with alternate sleeves 7. It will be readily seen that by holding the hub stationary and rotating the rim (or vice versa) the sleeves 7 may be forced in the direction of each other or apart from each other, according to the direction of rotation, thus slackening or tightening the spokes.

The sleeves 7 are provided with set-screws 15, adapted to engage the screw-threaded portion of the hub for the purpose of retaining the said sleeves in any position to which they may be adjusted. It will be understood that at no time is it intended that the spokes shall be strained or tightened to their utmost capacity, but that a moderate slack is to be left in order to avoid danger of breakage. It is this fact that renders the employment of set-screws necessary in order that when a proper adjustment has been made it shall be retained for a considerable length of time—that is, until continued wear renders a readjustment necessary.

When I state that the "preferred" form of my invention has been illustrated in Fig. 6 I mean thereby that this is a simple form which will answer all practical purposes. At the same time it may sometimes be preferred to use other forms, which have been illustrated in Figs. 7, 8, 9, and 10. Before proceeding to the description of the construction shown in these figures let it be understood that the spokes 12, at least in the construction shown in Fig. 6, are provided at their opposite ends with right and left hand threads adapted to engage the right and left hand threaded sockets provided for their reception, respectively, in the rim of the wheel and in the nipples 9. The latter being mounted loosely in the perforations provided for their reception in the flanges 8 of sleeve 7 will at all times permit the ready removal of any one of the spokes, this being effected by first slightly turning the nipple by means of a small wrench, and then rotating the spokes, so as to disengage its ends from the respective sockets, the nipple meanwhile being permitted to move radially with relation to the sleeve 7, making the insertion of a new spoke an extremely easy matter. Obviously when a spoke has been broken its removal is an equally easy matter. After the spoke has been moderately tightened by causing its right and left hand threaded ends to engage the threaded recesses in the nipple and in the rim of the wheel the nipple may be further tightened thereon, so as to insure the desired degree of tightness and tension.

The modification of my invention which has been illustrated in Fig. 7 of the drawings shows the sleeves 7, having the flanges 8, as being provided with cavities or recesses 16 in the inner sides of said flanges. In these seats 16 are placed the ball-shaped heads 17 of nipples $9^a$, which it will thus be seen are smoothly seated, so as to greatly facilitate their turning when necessary by means of a wrench engaging a wrench-seat 18, which may in this instance be formed exteriorly upon the stem of the nipple. The flanges 8 of the sleeves may when this form of nipple is employed be provided with notches 19, through which said nipple members may be placed in their respective sockets.

In Fig. 8 of the drawings has been shown still another modification, which consists in dividing each of the sleeves 7 and showing the same composed of two individual members $7^b$ $7^g$, one of which may be threaded, while the other is loose upon the hub 1. A device, such as a jam-nut $9^b$, may be employed to hold the two parts $7^b$ $7^g$ together in operative position, said members being provided with oppositely-disposed recesses $10^b$ for the reception of the nipple, which here is designated $11^b$. The respective construction of the members $7^g$ may be further modified to enable them to receive and coöperate with nipples of different constructions, and other means than a jam-nut may be employed for the purpose of connecting them together in operative position; but it is not deemed necessary to illustrate any such further modifications, as the general form thereof will be readily understood by reference to Fig. 8 of the drawings.

In Fig. 9 I have illustrated still another modification of my invention, in which case the spokes are provided at their inner ends with heads $8^c$, adapted to engage notched recesses $9^c$ in the flanges of the sleeves 7, which are movable upon the hub, the outer ends of said spokes being provided with screw-threads adapted to engage nipples $10^c$, which are permanently seated in the rim of the wheel.

In Fig. 10 of the drawings I have shown still another form of spoke, which is centrally divided, so as to form two separate parts $10^g$ and $10^k$, each of which is provided with means for connection with the hub and the rim of the wheel. The inner adjacent ends of said spoke sections are provided with right and left hand threads $10^l$, adapted to be connected by a right and a left hand threaded sleeve or nipple $10^m$, having radial projections, as $10^o$, whereby it may be tightened by hand, so as to stretch or tighten the spokes to any desired degree.

In Fig. 17 of the drawings I have shown a modified construction of a spoke, which latter is provided at an intermediate point of its length with a wrench-seat 20, whereby it may be conveniently turned in the act of adjusting it in or removing it from sockets provided for the reception of the right and left threaded ends of said spokes.

This improvement may be applied to any one of the different forms of spokes herein shown and described or capable of being utilized in connection with my invention. It may further be stated that the wrench-seat 20 may be disposed about centrally upon the spokes or near either end of the latter or, in fact, at any desired and convenient point upon said spokes.

The rim of my improved wheel is usually and preferably composed of three individual parts—namely, an inner tubular metallic rim 21, a channel-bar 22, which has an interior groove 23 exteriorly fitting the tubular rim 21 and provided with an exterior groove or channel 24, in which the third member of the entire rim, which consists of a rubber tire, is securely seated.

The tubular member 21 is preferably bent from a metallic tube of suitable dimensions, the ends of which are provided with right and left hand threads 26, which are engaged by the ends of a right and left hand threaded solid nipple 27, having a centrally-disposed wrench-seat 28. It will be readily seen that by means of this nipple the tubular rim 21 may be expanded and contracted within reasonable limits to any extent which may be necessary in order to permit the initial adjustment to be properly made and which may be further required when readjustment is made necessary by wear or other causes. The channel-bar, the cross-sectional appearance of which will be readily understood by reference to several of the figures of the drawings, is bent so as to encircle the tubular rim 21, and it is provided at one of its meeting ends with a plate 29, riveted or otherwise suitably connected therewith, overlapping the other meeting end and provided with side flanges 30 at the edges thereof and at the point where the lap between the meeting ends and the channel-bar is located. The opposite end of the channel-bar to that which is permanently connected with the lap-plate 29 by means of rivets 31 is adjustably connected with said lap-plate by means of bolts 32 or other suitable means which will enable the desired adjustment to be effected whenever necessary.

The channel-plate 22, as already described, forms a seat for the rubber tire 25, and it will be noticed that said rubber tire is seated between and fully protected by the lugs or flanges 30 at the meeting ends of the channel-bar, thereby preventing abrasion or other injury to the rubber tire. The latter is constructed in the usual manner with longitudinal strengthening-wires 33, and in Fig. 15 of the drawings I have illustrated the means whereby the meeting ends of these wires are to be connected. It is well understood that the usual way of effecting this connection is by laying bare the ends of the wires by removing the rubber covering or by pushing it back upon the wires, or both, until a sufficient length of said wires has been exposed which shall enable them to be brazed together, after which the compressed rubber is permitted to expand and thus to cover the rubber tire. As is very obvious, this requires the services of a skilled mechanic, which are not always ready at hand. By my present improvement I simply provide the meeting ends of the wires 33 with right and left hand threads 34, which are laid bare by compressing the meeting ends of the rubber covering. The adjacent ends of the wires are then connected by means of a right and left hand threaded nipple 35, and this having been accomplished the compressed portion of the rubber ends are released and springing back into position will cover the connected ends of the wires, thus completing the tire, which may then be readily sprung into position upon the channel-bar of the wheel.

In the modification shown in Fig. 16 of the drawings the sleeve or nipple, (here designated 35,) is provided with an exterior screw-thread $35^{r}$, which is made right and left hand, as shown, so as to correspond with the interior right and left hand thread in said nipple. Said exterior screw-thread is also made considerably coarser than the interior thread. When this device is used, the nipple is first placed in engagement with the wires, which are partly drawn together. The exterior screw-threaded portion of the nipples is then brought into engagement with the rubber, which will readily engage the exterior threaded portion, the ends of the rubber being in this manner drawn together and caused to meet at about the time when the threaded ends of the wires have been brought together. Previous to coming in contact with each other the abutting ends of the rubber tire may be coated with cement in order that a perfectly tight joint may be made. This, however, will be optional with the user of the device, inasmuch as by removing the thin wrench, which is used to manipulate the nipple, the ends of the rubber will naturally spring together and form a very close joint.

At the point at which the meeting ends of the tubular rim are connected is provided a covering-plate 36, the curvature of which is equal to that of the rim, to which it is also fitted transversely. Said covering-plate is provided with slots 37 for the reception of bolts 38, by means of which it is mounted upon the inner side of the rim, so as to completely cover the juncture of the meeting ends.

When a wheel embodying my improvements is mounted upon the spindle of an ordinary axle, the sleeve or collar 4 engages the shoulder usually found upon the axle, and said sleeve or collar is provided with an interiorly-disposed split ring 40, and a plurality of set-screws 41 are mounted in the said sleeve with their inner ends bearing against the split ring, which may thus be suitably centered and compressed to fit neatly upon and form a bearing for the spindle. It is obvious that by this construction wear may be compensated for by simply tightening the set-screws 41. I also provide a sand-band 42, which is composed of two independent sections $42^a$ and $42^b$, formed by sawing in two an exteriorly-screw-threaded sleeve of suitable dimensions, which is provided with a wrench-seat 43, by means of which it may be turned. This sand-band being composed, as shown, of two halves may be readily fitted upon the axle after the wheel has been placed in position and may then be tightened, so as to provide a joint sufficiently tight to prevent the entrance of sand and dirt into the bearings. The meeting edges of the parts $42^a$ and $42^b$ are provided, respectively, with projections 44 and recesses 45, which enable the said parts to be very conveniently and accurately placed in registry with each other. The simplest way of attaining this construction, and the one of which I prefer to avail myself, is by boring diametrically opposite holes through the sleeve before splitting the same by sawing and then sawing the same apart otherwise than diametrically of the perforations. Ordinary rivets may then be seated and clenched in the larger halves of the perforations, the protruding portions of said rivets being thus adapted to accurately fit the smaller halves of said perforations. Other methods of compelling the parts of the sand-band to register with each other may, however, be used whenever preferred.

Under many circumstances it will be found desirable to use wheels containing my improvements or parts of said improvements in connection with antifriction-bearings. In such case it will be a comparatively simple matter to transform the hub of my improved wheel, which has been constructed as hereinbefore described, to an antifriction-wheel by simply removing certain parts from the same and substituting others, as will be seen particularly illustrated in Fig. 19 of the drawings. By reference to this figure it will be seen that the sleeve 4, containing the split ring 40, and the split ring 5 at the outer end of the tubular axle-box have been entirely removed, thus retaining of the axle-box only the tubular member 1. This, it will be noted, is provided at its opposite ends with right and left hand screw-threads, and upon these screw-threads are mounted correspondingly-threaded sleeves 80, which are interiorly right and left hand threaded for the reception of exteriorly-threaded rings 81, the inner adjacent ends of which are concave, as shown at 82, so as to coöperate with the spindle members, to be presently described, to form ball-races. In Fig. 19 has been shown a spindle 83, which is cylindrical and which is provided at its ends with screw-threads 84, upon which are mounted adjustable members or nuts 85, the ends of which are concave, as will be seen at 86. Set-screws 87 are provided to retain the members 85 in adjusted position, and it is preferred to provide set-screws 88 in the sleeves 80 for the purpose of retaining the rings 81 in adjusted position.

When the parts are assembled, the spindle occupies an axial position within the tubular box 1, and the spindle members 85 at each end are disposed between the rings 81 of each sleeve, antifriction-balls 89 being disposed in the ball-races formed by the coöperating concave faces of the rings 81 and the nuts or spindle members 85. It will be seen that by the construction described the various parts may be adjusted and retained in adjusted position in such a manner as to insure a perfect fit and the most advantageous results. It is also obvious that readjustment may be made at any time when it may be rendered necessary on account of wear.

In Fig. 20 I have illustrated a specially-constructed wrench 75, adapted to engage the split bands 5 and 40 and adjust the same in their proper positions.

In Fig. 21 has been illustrated a sectional view of the rim 76 of a bicycle-wheel constructed of sheet metal and which is provided with a central groove 77, adapted to form a seat for the pneumatic tire $77^a$, which is thereby held more securely against lateral displacement than by devices heretofore employed within my knowledge.

From the foregoing description, taken in connection with the drawings hereto annexed, the operation and advantages of my invention will be readily understood by those skilled in the art to which it appertains.

I desire it to be understood that the various features of my invention may be used separately and independently of each other and may be applied to other and differently-constructed wheels which will admit of the application thereto of the individual features of my invention. I also desire it to be understood that I do not limit myself to the precise structural details herein set forth, but reserve the right to any changes, alterations, and modifications which may be resorted to within the scope of my invention and without departing from the spirit or sacrificing the efficiency of the same.

Having thus described my invention, I claim—

1. In a wheel, a cylindrical hub having right and left hand threaded portions, correspondingly-threaded sleeves mounted thereon, radially-movable nipples connected with said sleeves, and spokes provided at their ends with right and left hand threads engaging correspondingly-threaded sockets in the nipples and in the rim of the wheel.

2. In a wheel, a cylindrical hub having laterally-movable sleeves, nipples connected with said sleeves and radially movable with relation thereto, and spokes having right and left hand threaded ends engaging correspondingly-threaded recesses in the nipples and in the rim of the wheel.

3. In a wheel, a cylindrical hub having right and left hand threaded portions, correspondingly-threaded sleeves mounted thereon and having annular flanges, nipples engaging said flanges, and spokes connecting said nipples with the rim of the wheel.

4. In a wheel, a cylindrical hub having right and left hand threaded portions, correspondingly-threaded sleeves adjustable thereon, means for retaining said sleeves in adjusted position, annular flanges upon said sleeves, nipples engaging said flanges, and spokes connecting said nipples with the rim of the wheel.

5. In a wheel, a cylindrical hub having right and left hand threaded portions, correspondingly-threaded sleeves adjustable upon said hub and having laterally-extending annular flanges provided with concave recesses in their inner sides, nipples having ball-shaped heads engaging said recesses, and spokes provided at their ends with right and left hand threads adapted to engage correspondingly-threaded recesses in the nipples and in the rim of the wheel.

In testimony that I claim the foregoing as my own I have hereto affixed my signature in the presence of two witnesses.

FRANKLIN P. WHITE.

Witnesses:
S. E. WHITE,
I. M. INMAN.